(12) United States Patent
Wu et al.

(10) Patent No.: US 12,468,336 B2
(45) Date of Patent: Nov. 11, 2025

(54) INFORMATION HANDLING SYSTEM FOLIO STYLUS GARAGE POWER MANAGEMENT

(71) Applicant: Dell Products L.P., Round Rock, TX (US)

(72) Inventors: Li Min Wu, Taoyuan (TW); Yaotsung Chang, Taipei (TW); Chen Hsin Chang, Keelung (TW)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 18/226,880

(22) Filed: Jul. 27, 2023

(65) Prior Publication Data

US 2025/0036160 A1   Jan. 30, 2025

(51) Int. Cl.
*G06F 1/00* (2006.01)
*G06F 1/16* (2006.01)
*G06F 1/3234* (2019.01)
*G06F 3/0354* (2013.01)

(52) U.S. Cl.
CPC .......... *G06F 1/1607* (2013.01); *G06F 1/1677* (2013.01); *G06F 1/3259* (2013.01); *G06F 3/03545* (2013.01)

(58) Field of Classification Search
CPC ..... G06F 1/1607; G06F 1/1677; G06F 1/3259
See application file for complete search history.

(56) References Cited

U.S. PATENT DOCUMENTS

| | | |
|---|---|---|
| 1,070,667 A | 8/1913 | Clark |
| 6,114,958 A * | 9/2000 | Murphy ............... G06F 1/1616 340/568.1 |
| 6,924,791 B1 * | 8/2005 | Nicolas ............... G06F 1/3203 345/173 |
| 7,210,046 B2 | 4/2007 | Truong |
| 11,314,288 B2 | 4/2022 | Goh et al. |
| 11,347,331 B2 | 5/2022 | Files et al. |
| 2007/0273673 A1 * | 11/2007 | Park ..................... G06F 3/04883 345/179 |
| 2020/0052520 A1 * | 2/2020 | Kang .................... G06F 1/1626 |
| 2020/0110475 A1 * | 4/2020 | Files .................... G06F 1/1656 |
| 2022/0058038 A1 * | 2/2022 | Park ..................... G06F 3/04842 |

* cited by examiner

*Primary Examiner* — Mohammed H Rehman
(74) *Attorney, Agent, or Firm* — Zagorin Cave LLP; Robert W. Holland

(57) ABSTRACT

A portable information handling system stores a stylus in a stylus garage having a stylus presence detection so that on removal of the stylus from the garage the information handling system transitions from a low power state to an on state. In one example embodiment, a low power OR gate monitors a pair of contacts of the stylus to initiate power to an embedded controller when one or both contacts separate from the stylus. The embedded controller detects the stylus position, the housing lid position and other factors to determine when to command power up of the system CPU for transition from the low power state to an on state.

11 Claims, 9 Drawing Sheets

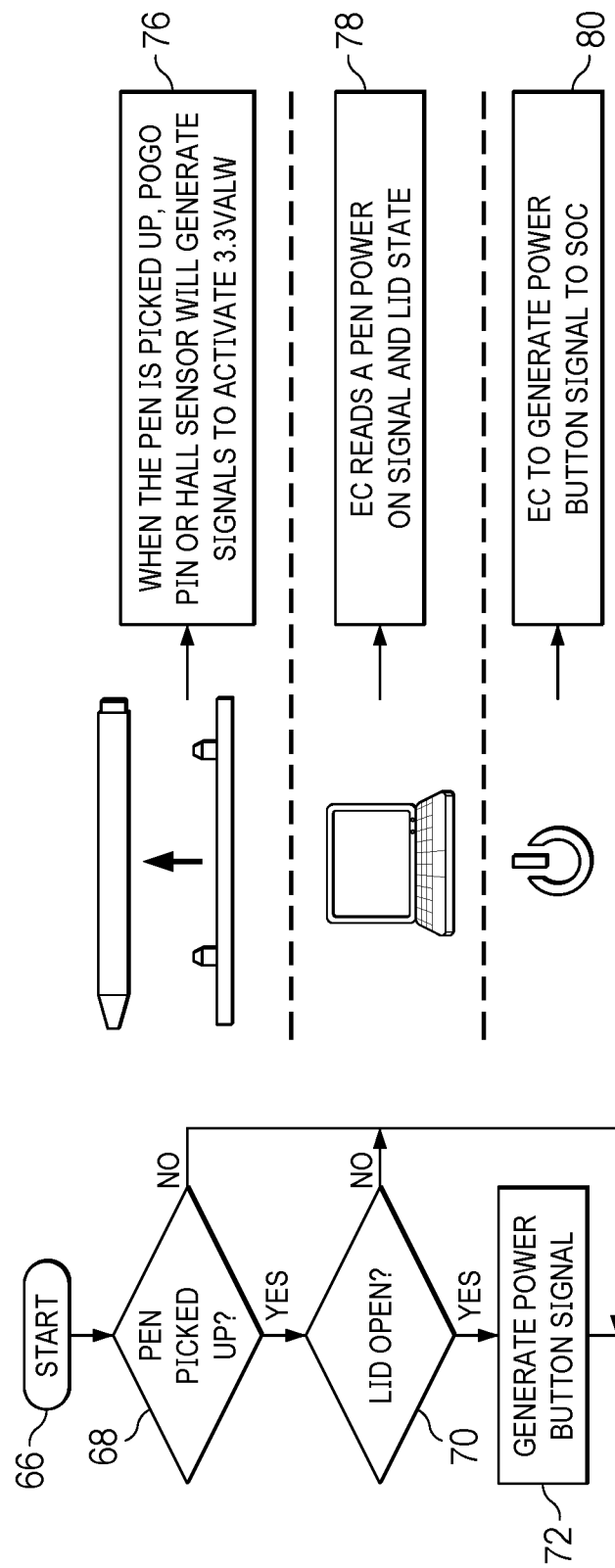

INFORMATION HANDLING SYSTEM FOLIO STYLUS GARAGE POWER MANAGEMENT

BACKGROUND OF THE INVENTION

Field of the Invention

The present invention relates in general to the field of portable information handling systems, and more particularly to an information handling system folio stylus garage power management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, information handling systems interact with end users through input/output (I/O) devices, such as a keyboard, mouse and display. Portable information handling systems typically integrate the keyboard and a touchpad that provides mouse features like pointer control. Tablet information handling systems have a planar housing that typically does not include a keyboard and instead uses a virtual keyboard presented at a touchscreen display. Although a virtual keyboard accepts typed inputs similar to a physical keyboard, the lack of feedback from moving keys tends to make virtual keyboards difficult to interact with. One solution for tablet information handling systems is a keyboard folio carrier that holds the tablet and includes a keyboard similar to a convertible information handling system. An end user can open the folio carrier to expose the keyboard similar to convertible laptop or can separate the tablet to use the tablet in a stand alone mode. In many instances, the end user will interact with the tablet touchscreen using a stylus that imitates a pen.

One trouble with a stylus is that it is completely free from the information handling system so that it can easily become lost. One solution is to have a storage garage to hold the stylus while not in use. The garage can be a magnet that holds the stylus next to the information handling system housing or a concaved area that matches the stylus form. Another option is to have the garage in a folio that holds the tablet information handling system. Although the stylus is less likely to be lost, interaction with the information handling system is not typically supported until an end user removes the stylus from the garage and turns the information handling system on.

SUMMARY OF THE INVENTION

Therefore, a need has arisen for a system and method which detects stylus separation from an information handling system garage to command transition of the information handling system from a low power state to an on state.

In accordance with the present invention, a system and method are provided which substantially reduce the disadvantages and problems associated with previous methods and systems for waking an information handling system from a low power state to an on state. A stylus is monitored in a stylus garage to detect removal and, in response to removal of the stylus, to transition the information handling system to an on state.

More specifically, an information handling system processes information with a processor in a planar housing that executes instructions in cooperation with a memory that stores the information and instructions. The planar housing integrates a display that presents information as visual images and couples to a keyboard folio carrier with an interface to communicate with logic of the keyboard folio carrier. A stylus garage in the keyboard folio carrier includes contacts that interface with the stylus when the stylus is garaged. A stylus removal circuit detects when the stylus lifts from the garage and, in response, applies power to the embedded controller of the information handling system. Once power is applied, the embedded controller switches power on with a GPIO signal and checks the stylus garage and the information handling system lid position detector to confirm that the stylus was removed and the lid is open and then in response commands the system CPU on so that the display presents visual information for interaction with an end user.

The present invention provides a number of important technical advantages. One example of an important technical advantage is that an information handling system is automatically powered to an on state from a low power state when a stylus is lifted from a stylus garage of the information handling system housing. An end user has the system transition to an on state as the end user prepares to write on the display with the stylus. The automated transition to the on state based upon stylus position allows an end user to quickly interact with the system without having to press a power button or other interface to command system power up and boot to an operational state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 depicts a flow diagram of a process for power management of an information handling system based upon stylus and lid position.

DETAILED DESCRIPTION

An information handling system having a keyboard folio with a stylus garage manages system power states based upon stylus location and folio position. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
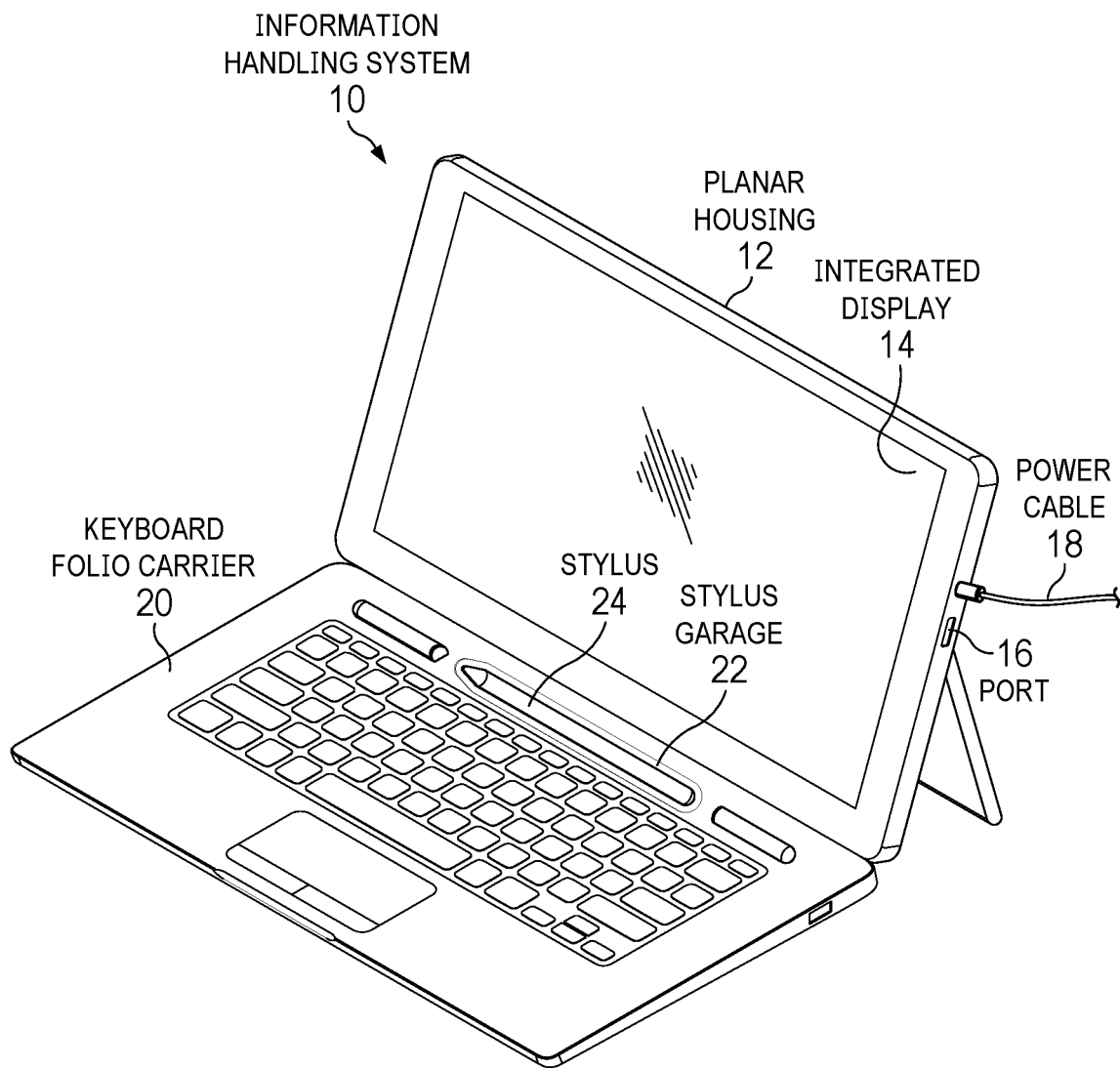
FIG. 1 depicts an information handling system having a keyboard folio carrier with a stylus garage that stores a stylus.

Referring now to FIG. 1, an information handling system 10 is depicted having a keyboard folio carrier 20 with a stylus garage 22 that stores a stylus 24. In the example embodiment, a detachable portable information handling system is presented that has a planar housing 12 with a tablet configuration. Planar housing 12 includes an integrated display 14 that presents information as visual images and a port 16 that accepts information and power from an external source, such as through a power cable 18. Planar housing 12 couples to keyboard folio carrier 20 through a signal interface at a bottom side so that key inputs made at the folio are communicated to a processor within planar housing 12. Integrated display 14 includes a touch detection surface that accepts touch inputs from stylus 24, such as handwritten notes. Although the example embodiment depicts detachable tablet configuration, in alternative embodiments a convertible information handling system may be used that has a hinged coupling between the planar housing and the keyboard housing. When stylus 24 is placed in the garage, the garaged position is detected. If the system is in a reduced power state, such as an ACPI S3/modern standby S4 or S5 state and stylus 24 is removed from stylus garage 22, the system powers up to prepare for end user engagement.

Figure 2:
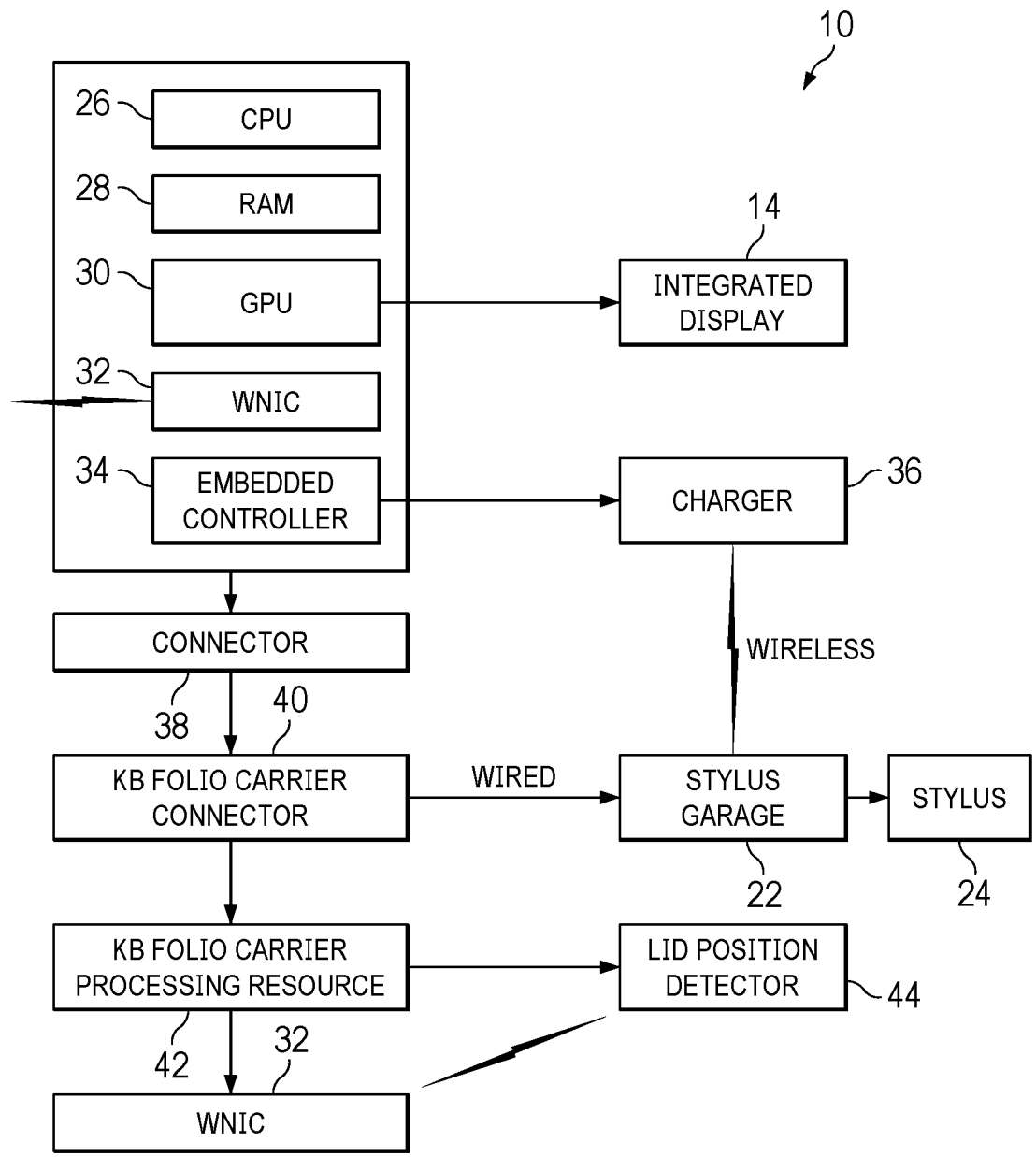
FIG. 2 depicts a block diagram of information handling system processing components that cooperate to manage power based upon stylus position.

Referring now to FIG. 2, a block diagram depicts information handling system 10 processing components that cooperate to manage power based upon stylus 24 position. Information handling system 10 processes information with a central processing unit (CPU) 26 that executes instructions in cooperation with a random access memory 28 that stores the instructions and information. A graphics processing unit (GPU) 30 further processes information to generate pixel values that define visual images for presentation at integrated display 14. A wireless network interface controller (WNIC) 32 supports wireless communication with external devices, such as through WIFI and BLUETOOTH. An embedded controller 34 manages operation of the processing components at a physical layer, such as application of power, maintenance of thermal constraints and interactions with input/output (I/O) devices like the keyboard. A connector 38 exposed at a side surface of the planar housing provides a communication and power interface between information handling system 10 and a keyboard folio carrier processing resource 42 through a keyboard folio carrier connector 40. Keyboard folio carrier processing resource 42 manages folio functions, such as communicating inputs to embedded controller 34.

In the example embodiment, stylus 24 interfaces through stylus garage 22 with keyboard folio carrier connector 40 to receive power as managed by keyboard folio carrier processing resource 42. In an alternative embodiment, a wireless charger 36 may provide charge to stylus 24 through stylus garage 22. In addition, stylus 24 may interface wirelessly through a WNIC 32 of the folio or of the information handling system. A lid position detector 44 interfaced with keyboard folio carrier processing resource 42 detects the position of the folio relative to the planar housing, such as open as shown in FIG. 1 or closed over the integrated display. In an alternative embodiment, lid position detector 44 may be located in the planar housing and interfaced with embedded controller 34. When keyboard folio processing resource 42 detects the lid in an open position and a removal of stylus 24 from stylus garage 22, a signal is sent through the connector interface to command a wake of CPU 26, such as a GPIO signal to embedded controller 34 that initiates a wake from a low power state with ACPI or similar logic.

Figure 3A:
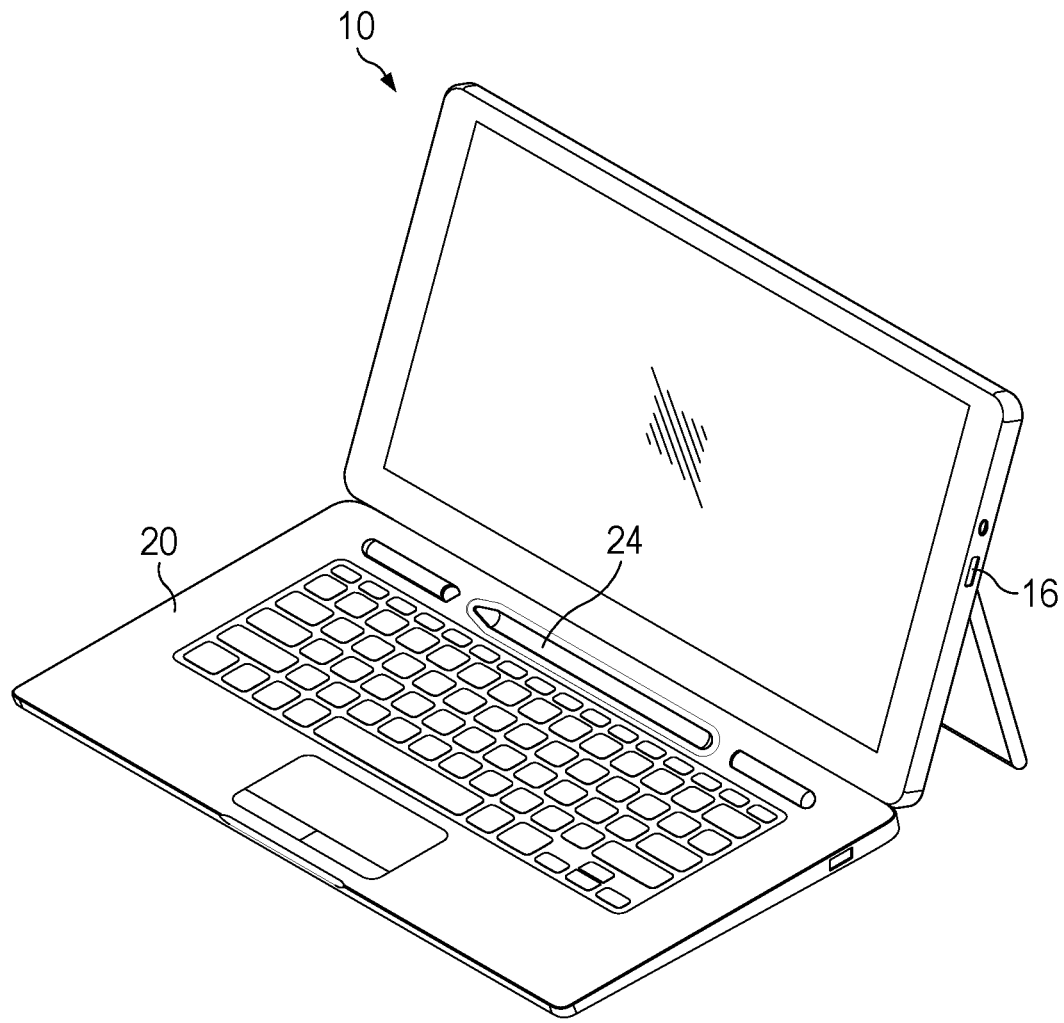
FIGS. 3A, 3B and 3C depict the information handling system transition to a power up state from a sleep or off state based upon stylus position.
Figure 3B:
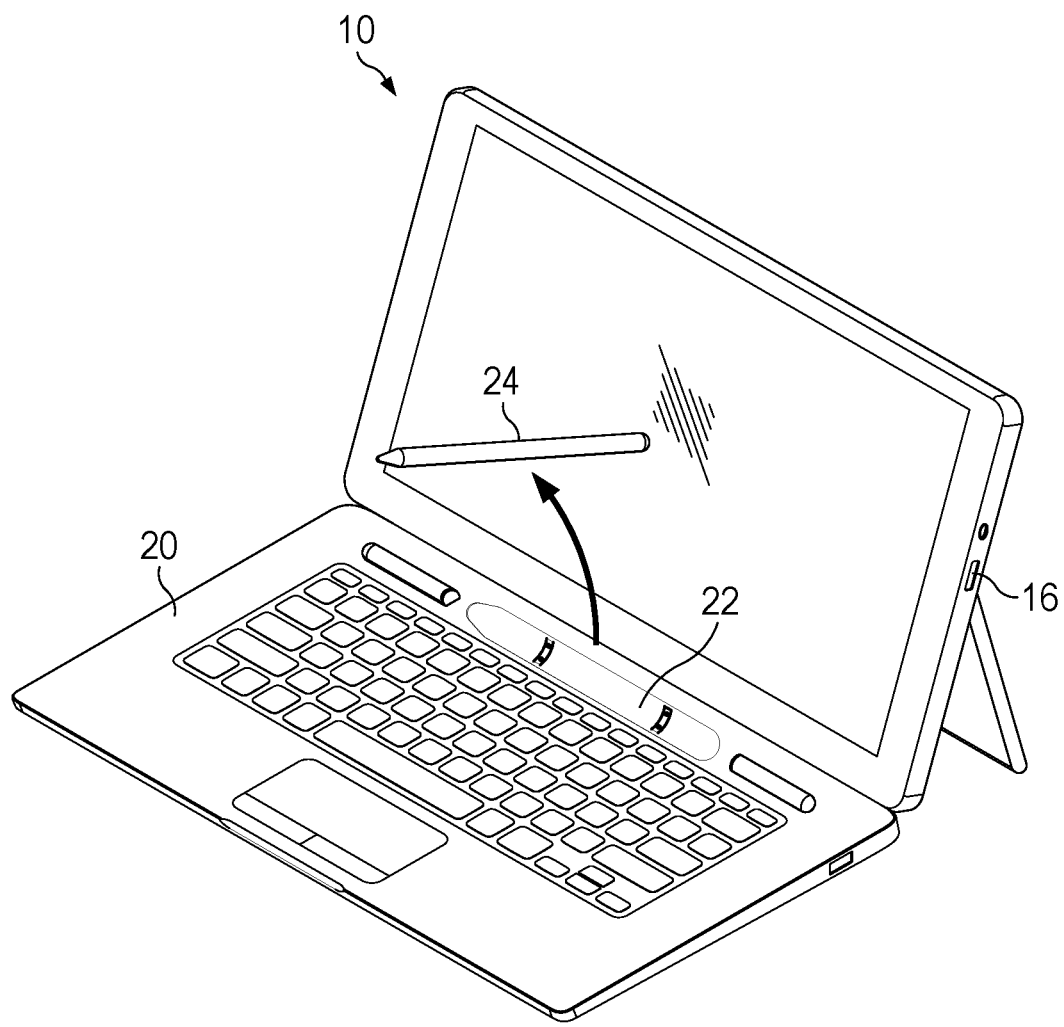
Figure 3C:
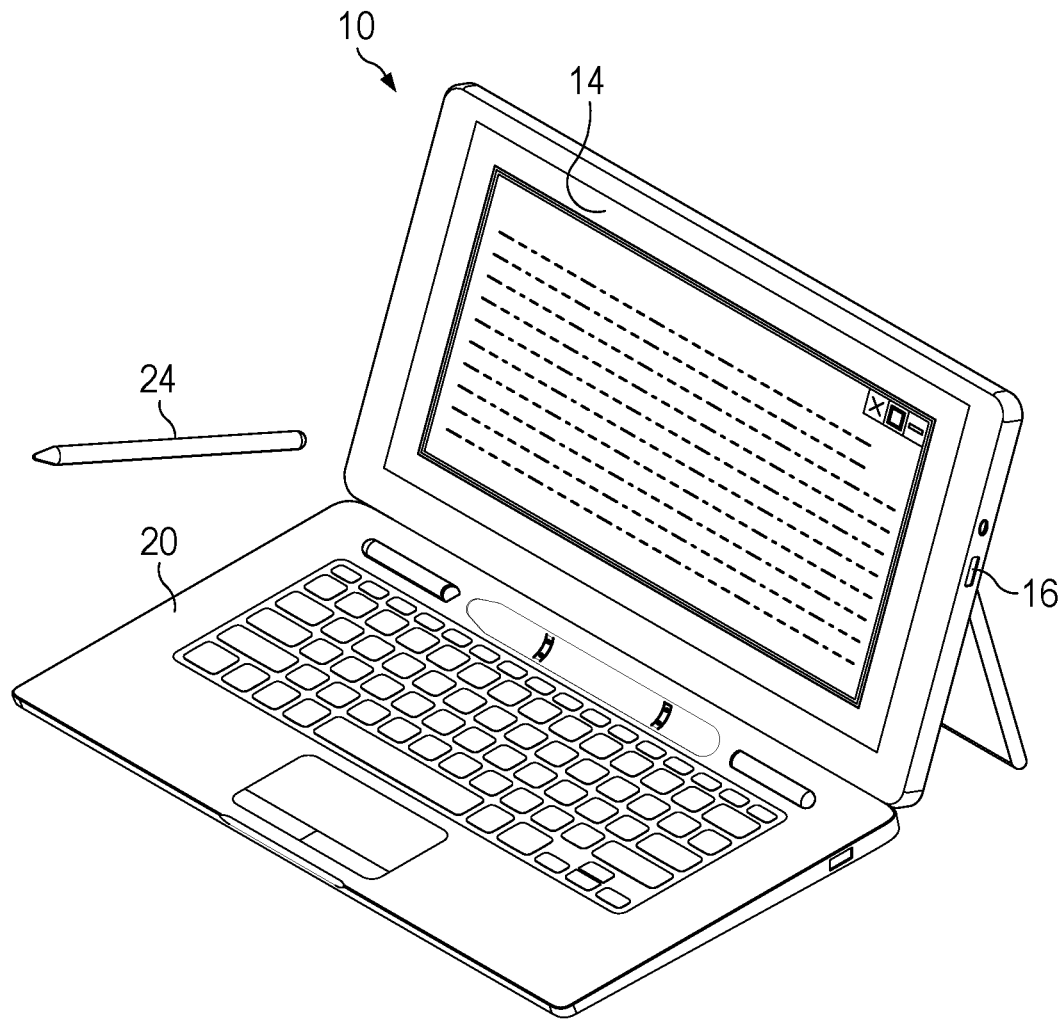

Referring now to FIGS. 3A, 3B and 3C, information handling system 10 transition to a power up state from a sleep or off state based upon stylus position is depicted. FIG. 3A depicts stylus 24 in stylus garage 22 of keyboard folio carrier 20 with information handling system 10 in an S3/modern standby/S4 or S5 ACPI low power state and in an open position. FIG. 3B depicts stylus 24 lifted out of stylus garage 22 to initiate transition to a wake state in which an end user can interact with the system. FIG. 3C depicts information handling system 10 fully booted to an operational state that presents visual images at integrated display 14 with stylus 24 removed from stylus garage 22. The command to transition from the low power to the full power state is initiated based upon the conditions of stylus 24 removed from stylus garage 22 when keyboard folio carrier 20 is in an open position and information handling system 10 is in a low power state.

Figure 4:
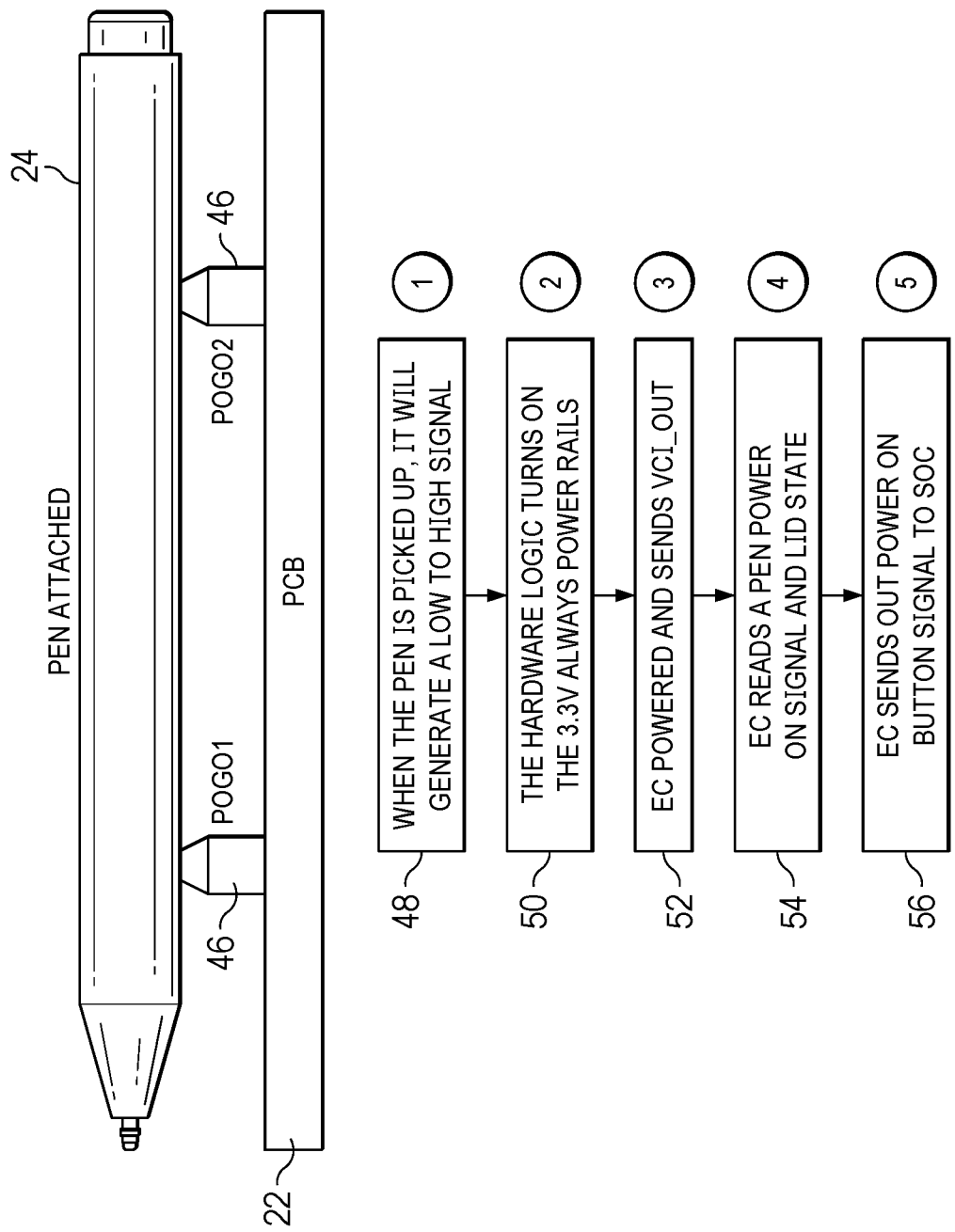
FIG. 4 depicts a flow diagram of a process for system power on where a stylus is depicted having first and second contacts within a stylus garage, such as pogo pins that support stylus charging.

Referring now to FIG. 4, a flow diagram depicts a process for system power on where a stylus is depicted having first and second contacts within a stylus garage, such as pogo pins that support stylus charging. Stylus 24 rests within the stylus garage 22 on first and second contacts 46 configured to provide a battery charge. At step 48 when the stylus is picked up to disconnect from contacts 46, the processing resource within the folio and interfaced with contacts 46 will detect a change from a low to a high signal, such as at a GPIO pin. At step 50, hardware logic such as that depicted in FIG. 5 generates a 3.3V current to the power rails that is presented at the folio interface with the information handling system. At step 52, the embedded controller of the information handling system detects the 3.3V and sends a VCI_OUT signal. At step 54, the embedded controller reads the stylus power on signal and checks the folio lid state. If the stylus is lifted from the folio and the lid is open, then at step 56 the embedded controller sends out the power on system to the CPU as if the power button has been pressed. The numbers 1-5 shown at steps 48-56 correspond to the numbers 1-5 shown in FIG. 5 below to associate hardware logic with performance of the method depicted by FIG. 4.

Figure 5:
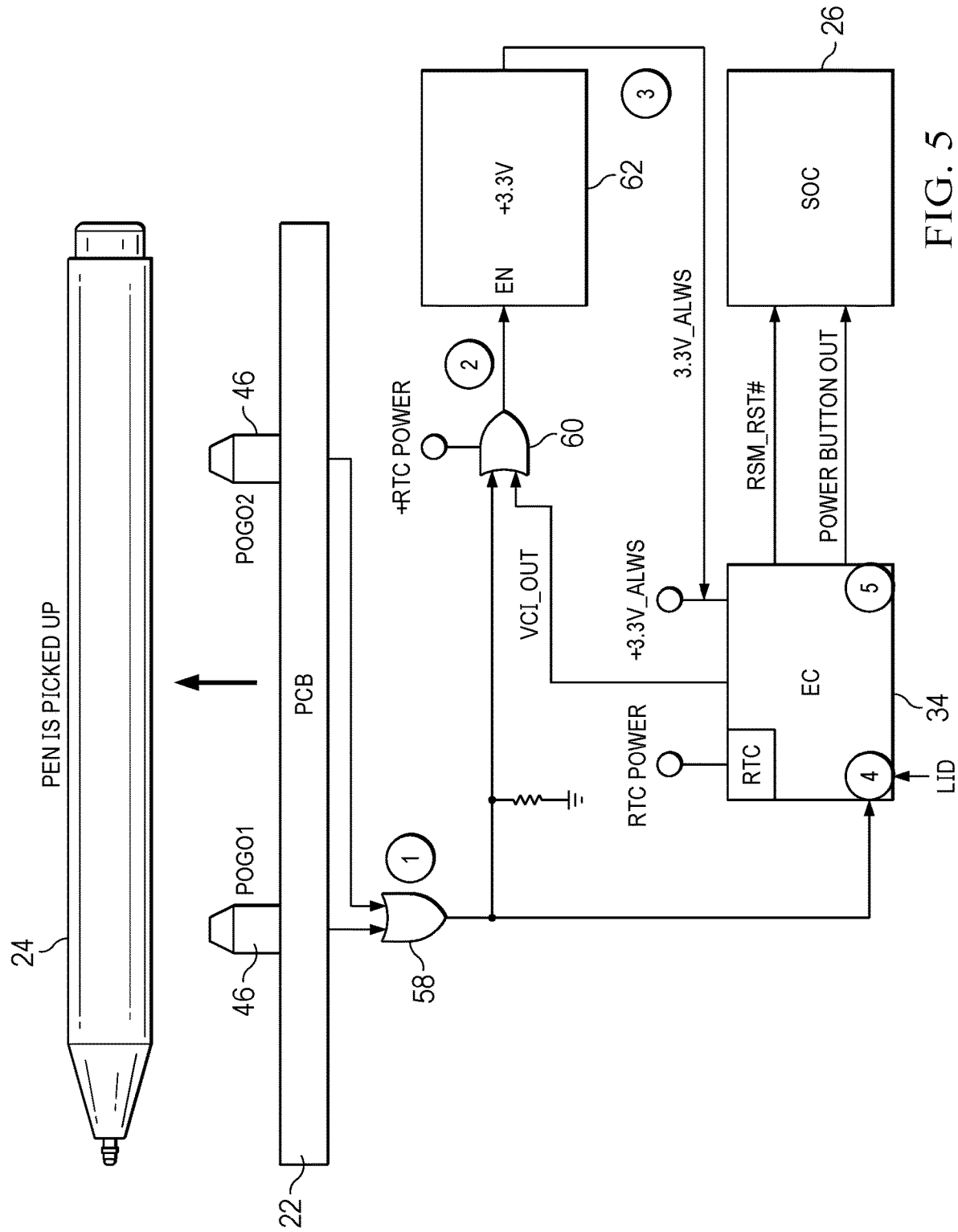
FIG. 5 depicts a circuit block diagram of hardware resources associated with detection of removal of the stylus and power up of the information handling system.

Referring now to FIG. 5, a circuit block diagram depicts hardware resources associated with detection of removal of stylus 24 and power up of the information handling system. As described above, the numbers 1-5 indicated the associated method of FIG. 4. When stylus 24 lifts away from contacts 46 of stylus garage 22, an OR gate 58 output shifts from low to high. In one example embodiment, a two logic gate consumes one microamp of current, which at 3.3V is only 6.6 microamps. The high signal provided to OR gate 60 enables 3.3V power out to the 3.3V_ALWS of the embedded controller 34. Once embedded controller 34 has power, a VCI_OUT signal is applied to OR gate 60 so that power is maintained until power up completes, even should stylus 24 be placed back in the garage. Embedded controller 34 then reads the lid position and the stylus position from OR gate 58 to determine whether to command a CPU start. If both the lid in open and the stylus is removed from the garage, the power button press is provided to CPU 26 to power up the information handling system to an on state, such as an S1 state. In one embodiment, embedded controller 34 may track stylus position at power down so that a power up of the system does not take place due to the stylus position where power is applied to the embedded controller for reasons other than stylus movement, such as if system maintenance is being performed by the embedded controller or other functions have brought the embedded controller to the one state without a CPU start desired.

Figure 6:
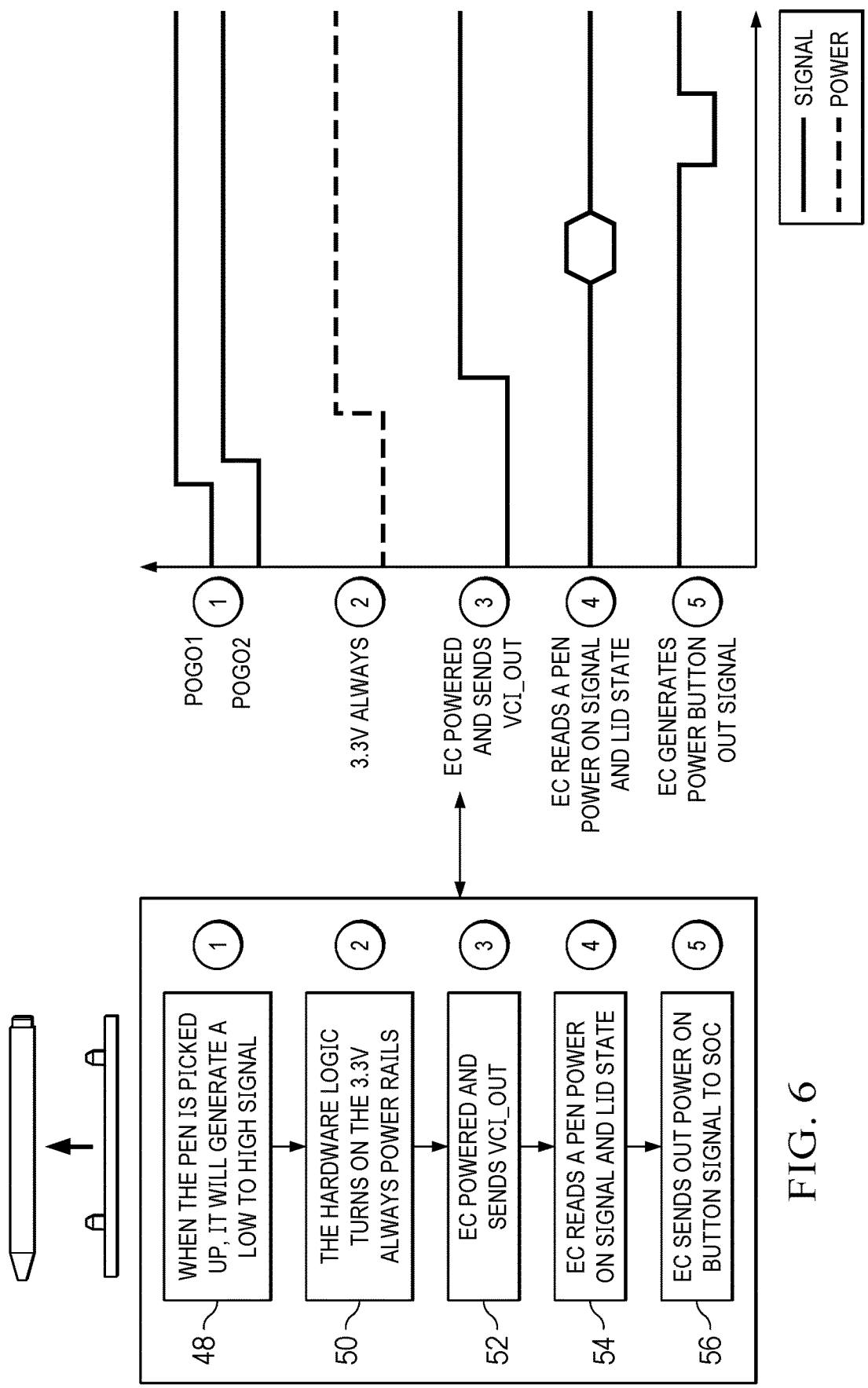
FIG. 6 depicts a flow diagram and associated signal logic diagram of signaling communicated during steps 1-5 of FIGS. 4 and 5.

Referring now to FIG. 6, a flow diagram and associated signal logic diagram depicts signaling communicated during steps 1-5 of FIGS. 4 and 5. At step 48, lifting of either contact of the stylus will generate a high signal from the OR gate interfaced with both contacts. At step 50, a high signal from the OR gate will enable power from 3.3V ALWAYS. At step 52, power applied at the embedded controller results in VCI_OUT to high. At step 54, the reading of the stylus lifted and the lid open states results in a logical high at the embedded controller so that at step 56 the embedded controller sends a power up logic low pulse to the CPU to initiate system power up.

Referring now to FIG. 7, a flow diagram depicts a process for power management of an information handling system based upon stylus and lid position. The process starts at step 66 with monitoring a position of a stylus in a stylus garage of an information handling system. In the example embodiment, an OR gate monitors both power contacts of the stylus. In alternative embodiments other types of sensors may be used to detect stylus position, such as a Hall sensor in the information handling system aligned with a magnet of the stylus. In one alternative embodiment, a wireless charger detects removal of the stylus, such as with a change in the magnetic field when the opposite sides of the charger move apart. At step 68 a determination is made of whether the stylus is picked up from the stylus garage. As indicated by step 76, when the stylus is picked up, the pogo pin or a Hall sensor generates signals to activate 3.3VALW always on power. If yes at step 68, the process continues to step 70 to determine if the lid is open at the system, such as by having the embedded controller read inputs from both a lid pin and the stylus position pin as indicated by step 78. If both the stylus is removed from the garage and the lid is open, at step 72 a power button signal is generated for communication to start the system CPU as indicated by step 80 and the process ends at step 74. In one embodiment, the stylus separation is detected by a Hall sensor or wireless charger. In another embodiment in which the information handling system has a WNIC with a wake capability, separation of the stylus can wake the stylus, which sends a wake command to the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information;
   a touchscreen display coupled to the housing;
   a stylus garage associated with the housing and configured to hold a stylus;
   a stylus configured to couple to the stylus garage;
   a lid position sensor disposed in the housing and configured to determine when the housing is in an open position and a closed position; and
   a circuit interfaced with the stylus garage and operable to transition the processor from an off state having no power to an on state having power when the stylus decouples from the stylus garage, the circuit confirming the open position when the stylus decouples before transitioning the processer to the on state;
   wherein:
   the stylus garage comprises first and second contacts interfaced with the stylus when the stylus couples in the stylus garage;
   the circuit comprises a first OR gate interfaced with the first and second contacts to generate a power on command when either of the first and second contacts separate from the stylus; and the circuit further comprises a second OR gate interfaced with the first OR gate and with an embedded controller, the second OR gate enabling power when either the first OR gate or the embedded controller communicates a power on command.

2. The information handling system of claim 1 wherein the embedded controller interfaces with the lid position sensor and the first OR gate to apply the stylus and lid positions.

3. The information handling system of claim 1 wherein the housing comprises:
   a planar housing containing the processor, the memory and the touchscreen display; and
   a keyboard folio carrier having a keyboard and the stylus garage.

4. The information handling system of claim 3 further comprising:
   a connector exposed at one side of the planar housing; and
   a keyboard folio carrier connector exposed at the keyboard folio carrier and configured to removably couple with the connector.

5. The information handling system of claim 4 wherein the processor transitions to the on state and delays presentation of visual images at the integrated display until an interaction with the stylus.

6. The information handling system of claim 1 wherein:
   the stylus comprises a magnet; and
   the stylus garage comprises a Hall sensor operable to detect movement of the magnet away from the housing.

7. A method for managing an information handling system power state, the method comprising:
   placing a processor in an off state having no power;
   placing a stylus in a stylus garage of a housing of the information handling system;
   touching the stylus against first and second contacts of the stylus garage;
   interfacing the first and second contacts with a first OR gate;
   generating a power on command signal out with the OR gate when either the first or second contact is removed from touching the stylus;
   interfacing the power on command signal with a second OR gate;
   interfacing an embedded controller with the second OR gate; and
   sending a power enable signal from the second OR gate to a power system when the first OR gate sends the power on command or when the embedded controller sends the power on command; and
   detecting removal of the stylus from the housing; and
   in response to the detecting, transitioning the processor to a power on state having power generating a power on command when either of the first and second contacts is removed from touching the stylus.

8. The method of claim 7 further comprising:
   interfacing a lid sensor with the embedded controller;
   commanding power up of a central processing unit with the embedded controller when the stylus is removed from touching the first or second contact the lid sensor detects the information handling system housing in an open position.

9. The method of claim 8 further comprising directing interfacing the first OR gate output with the embedded controller.

10. The method of claim 7 wherein detecting removal of the stylus further comprises detecting movement of a magnet included in the stylus with a Hall sensor included in the information handling system housing.

11. A system for power management of an information handling system comprising:
   a stylus garage associated with the housing and configured to hold a stylus;
   a stylus configured to couple to the stylus garage;
   first and second contacts interfaced with the stylus when the stylus couples in the stylus garage;
   a lid position sensor disposed in the information handling system and configured to determine when the information handling system is in an open position and a closed position; and
   a circuit interfaced with the stylus garage and operable to transition the information handling system from an off state to an on state when the stylus separates from the stylus garage the circuit having a first OR gate interfaced with the first and second contacts to generate a power on command when either of the first and second contacts separate from the stylus, the circuit having a second OR gate interfaced with the first OR gate and with an embedded controller, the second OR gate enabling power when either the first OR gate or the embedded controller communicates a power on command, the circuit confirming the open position when the stylus separates before transitioning the processer to the on state.

* * * * *